United States Patent
Hosseini et al.

(10) Patent No.: US 10,320,446 B2
(45) Date of Patent: Jun. 11, 2019

(54) MINIATURIZED HIGHLY-EFFICIENT DESIGNS FOR NEAR-FIELD POWER TRANSFER SYSTEM

(71) Applicant: ENERGOUS CORPORATION, San Jose, CA (US)

(72) Inventors: Alister Hosseini, Long Beach, CA (US); Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 263 days.

(21) Appl. No.: 15/269,729

(22) Filed: Sep. 19, 2016

(65) Prior Publication Data

US 2017/0187422 A1   Jun. 29, 2017

Related U.S. Application Data

(63) Continuation-in-part of application No. 15/046,348, filed on Feb. 17, 2016, now Pat. No. 10,027,158.

(Continued)

(51) Int. Cl.
*H04B 5/00* (2006.01)
*H02J 50/23* (2016.01)
*H02J 50/27* (2016.01)

(52) U.S. Cl.
CPC .............. *H04B 5/005* (2013.01); *H02J 50/23* (2016.02); *H02J 50/27* (2016.02); *H04B 5/0037* (2013.01)

(58) Field of Classification Search
USPC ................................................ 320/107–115
See application file for complete search history.

(56) References Cited

U.S. PATENT DOCUMENTS

| 787,412 A | 4/1905 | Tesla |
| 3,167,775 A | 1/1965 | Guertler |

(Continued)

FOREIGN PATENT DOCUMENTS

| CN | 203826555 U | 9/2014 |
| CN | 104090265 A | 10/2014 |

(Continued)

OTHER PUBLICATIONS

Energous Corp., ISRWO, PCT/US2014/037170, Sep. 15, 2014, 11 pgs.

(Continued)

*Primary Examiner* — Binh C Tat
(74) *Attorney, Agent, or Firm* — Morgan, Lewis & Bockius LLP

(57) ABSTRACT

Near-field power transfer systems can include antenna elements that constructed or printed close to each other in a meandered arrangement, where neighboring antenna elements conduct currents that flow in opposite directions. This current flow entirely or almost entirely cancels out any far field RF radiation generated by the antennas or otherwise generated by the electromagnetic effects of the current flow. For a first current flowing in a first path, there may be a second current flowing in a second cancellation path, which cancels the far field radiation produced by the first current flowing in the first path. Therefore, there may be no radiation of power to the far field. Such cancellation, may not occur in a near-field active zone, where the transfer of power may occur between the transmitter and the receiver. A ground plane may block the leakage of power from the back of a transmitter and/or a receiver.

18 Claims, 11 Drawing Sheets

Related U.S. Application Data

(60) Provisional application No. 62/374,578, filed on Aug. 12, 2016, provisional application No. 62/387,205, filed on Dec. 24, 2015.

(56) References Cited

U.S. PATENT DOCUMENTS

| | | |
|---|---|---|
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |

(56) References Cited

U.S. PATENT DOCUMENTS

| | | |
|---|---|---|
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,172 B1 | 10/2017 | Leabman |
| 9,806,564 B2 | 10/2017 | Leabman |
| 9,819,230 B2 | 11/2017 | Petras et al. |
| 9,853,361 B2 | 12/2017 | Chen et al. |
| 9,866,279 B2 | 1/2018 | Bell et al. |
| 9,876,394 B1 | 1/2018 | Leabman |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brien et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0257634 A1 | 11/2007 | Leschin et al. |

(56) References Cited

U.S. PATENT DOCUMENTS

| | | |
|---|---|---|
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1* | 12/2010 | Rofougaran ......... H01Q 1/2283 320/108 |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |

(56) References Cited

U.S. PATENT DOCUMENTS

| | | |
|---|---|---|
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1* | 9/2012 | Partovi ............ H02J 7/025 320/108 |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1* | 12/2012 | Lu ............ H02J 17/00 320/108 |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |

(56) References Cited

U.S. PATENT DOCUMENTS

| | | |
|---|---|---|
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |

(56) References Cited

U.S. PATENT DOCUMENTS

| | | |
|---|---|---|
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0181117 A1 | 6/2015 | Park et al. |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |

(56) References Cited

U.S. PATENT DOCUMENTS

| | | |
|---|---|---|
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0240908 A1 | 8/2016 | Strong |
| 2016/0294225 A1 | 10/2016 | Blum et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380464 A1 | 12/2016 | Chin et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0110914 A1 | 4/2017 | Bell |
| 2017/0134686 A9 | 5/2017 | Leabman |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2018/0040929 A1 | 2/2018 | Chappelle |

FOREIGN PATENT DOCUMENTS

| | | |
|---|---|---|
| DE | 2000216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| GB | 2404497 A | 2/2005 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 9952173 | 10/1999 |
| WO | WO 200111716 A1 | 2/2001 |
| WO | WO 2003091943 A1 | 11/2003 |
| WO | WO 2004077550 A1 | 9/2004 |
| WO | WO 2006122783 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Energous Corp., IPRP, PCT/US2014/037170, Nov. 10, 2015, 8 pgs.
Energous Corp., ISRWO, PCT/US2014/041534, Oct. 13, 2014, 10 pgs.
Energous Corp., IPRP, PCT/US2014/041534, Dec. 29, 2015, 7 pgs.
Energous Corp., ISRWO, PCT/US2014/046956, Nov. 12, 2014, 10 pgs.
Energous Corp., IPRP, PCT/US2014/046956, Jan. 19, 2016, 7 pgs.
Energous Corp., ISRWO, PCT/US2014/037072, Sep. 12, 2014, 8 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.

(56) References Cited

OTHER PUBLICATIONS

Energous Corp., ISRWO, PCT/US2015/067275, Mar. 3, 2016, 8 pgs.
Energous Corp., IPRP, PCT/US2015/067275, Jul. 4, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2014/041546, Oct. 16, 2014, 12 pgs.
Energous Corp., IPRP, PCT/US2014/041546, Dec. 29, 2015, 9 pgs.
Energous Corp., ISRWO, PCT/US2015/67250, Mar. 30, 2016, 11 pgs.
Energous Corp., IPRP, PCT/US2015/67250, Mar. 30, 2016, 10 pgs.
Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2014/040697, Oct. 1, 2014, 12 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.
Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.
Energous Corp., ISRWO, PCT/US2014/041323, Oct. 1, 2014, 10 pgs.
Energous Corp., IPRP, PCT/US2014/041323, Dec. 22, 2015, 8 pgs.
Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/062682, Feb. 12, 2015, 10 pgs.
Energous Corp., IPRP, PCT/US2014/062682, May 3, 2016, 8 pgs.
Energous Corp., ISRWO, PCT/US2014/049666, Nov. 10, 2014, 7 pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP , PCT/US2014/045237, Jan. 12, 2016, 12 pgs.
Energous Corp., ISRWO , PCT/US2014/054897, Feb. 17, 2015, 10 pgs.
Energous Corp., IPRP, PCT/US2014/054897, Mar. 15, 2016, 8 pgs.
Energous Corp., ISRWO , PCT/US2015/067334, Mar. 3, 2016, 6 pgs.
Energous Corp., IPRP , PCT/US2015/067334, Jul. 4, 2017, 5 pgs.
Energous Corp., ISRWO , PCT/US2014/047963, Nov. 7, 2014, 13 pgs.
Energous Corp., IPRP , PCT/US2014/047963, Jan. 26, 2016, 10 pgs.
Energous Corp., ISRWO , PCT/US2014/054891, Dec. 18, 2014, 12 pgs.
Energous Corp., IPRP , PCT/US2014/054891, Mar. 15, 2016, 10 pgs.
Energous Corp., ISRWO , PCT/US2014/054953, Dec. 4, 2014, 7 pgs.
Energous Corp., IPRP, PCT/US2014/054953, Mar. 22, 2016, 5 pgs.
Energous Corp.,ISRWO , PCT/US2015/067294, Mar. 29, 2016, 7 pgs.
Energous Corp.,IPRP , PCT/US2015/067294, Jul. 4, 2017, 6 pgs.
Energous Corp.,ISRWO , PCT/US2014/062672 Jan. 26, 2015, 11 pgs.
Energous Corp., IPRP , PCT/US2014/062672 May 10, 2016, 8 pgs.
Energous Corp., ISRWO , PCT/US2016/069313 Nov. 13, 2017, 10 pgs.
Energous Corp., IPRP , PCT/US2016/069313 Jul. 3, 2018, 7 pgs.
Energous Corp.,ISRWO , PCT/US2014/044810 Oct. 21, 2014, 12 pgs.
Energous Corp., IPRP , PCT/US2014/044810, Jan. 5, 2016, 10 pgs.
Energous Corp., ISRWO , PCT/US2015/067271, Mar. 11, 2016, 6 pgs.
Energous Corp., IPRP , PCT/US2015/067271, Jul. 4, 2017, 5 pgs.
Energous Corp., ISRWO , PCT/US2014/040648, Oct. 10, 2014, 11 pgs.
Energous Corp., IPRP , PCT/US2014/040648, Dec. 8, 2015, 8 pgs.
Energous Corp., ISRWO , PCT/US2014/049673, Nov. 18, 2014, 10 pgs.
Energous Corp., IPRP , PCT/US2014/049673, Feb. 9, 2016, 6 pgs.
Energous Corp., ISRWO , PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., ISRWO, PCT/US2016/068495, Mar. 30, 2017, 9 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., ISRWO, PCT/US2016/068498, May 17, 2017, 8 pgs.
Energous Corp., ISRWO, PCT/US2016/068993, Mar. 13, 2017, 12 pgs.
Energous Corp., IPRP, PCT/US2016/068993, Jul. 3, 2018, 10 pgs.
Energous Corp., ISRWO, PCT/US2016/068565, Mar. 8, 2017, 11 pgs.

(56) References Cited

OTHER PUBLICATIONS

Energous Corp., ISRWO, PCT/US2016/068987, May 8, 2017, 10 pgs.
Energous Corp., ISRWO, PCT/US2016/069316, Mar. 16, 2017, 15 pgs.
Energous Corp., IPRP, PCT/US2016/069316, Jul. 3, 2018, 12 pgs.
Energous Corp., ISRWO, PCT/US2018/012806, Mar. 23, 2018, 9 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Order Granting Reexamination Request Control No. 90013793 dated Aug. 31, 2016, 23 pgs.
Ossia Inc. vs Energous Corp., PGR2016-00023—Institution Decision, Nov. 29, 2016, 29 pgs.
Ossia Inc. vs Energous Corp., PGR2016-00024—Institution Decision, Nov. 29, 2016, 50 pgs.
Ossia Inc. vs Energous Corp., PGR2016-00024—Judgement-Adverse, dated Jan. 20, 2017, 3 pgs.
ReExam Ordered Control No. 90013793 dated Feb. 2, 2017, 8 pgs.
Ossia Inc. vs Energous Corp., Declaration of Stephen B. Heppe in Support of Petition for Post-Grant Review of U.S. Pat. No. 9124125, PGR2016-00024, May 31, 2016, 122 pgs.
Ossia Inc. vs Energous Corp., Petition for Post-Grant Review of U.S. Pat. No. 9124125, May 31, 2016, 92 pgs.
Ossia Inc. vs Energous Corp., Patent Owner Preliminary Response, Sep. 8, 2016, 95 pgs.
Ossia Inc. vs Energous Corp., Petition for Post Grant Review of U.S. Pat. No. 9124125, May 31, 2016, 86 pgs.
Ossia Inc. vs Energous Corp., Declaration of Stephen B. Heppe in Support of Petition for Post-Grant Review of U.S. Pat. No. 9124125, PGR2016-00023, May 31, 2016, 144 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
European Search Report. EP15876036, dated May 3, 2018, 8 pgs.
European Search Report. EP15874273, dated Apr. 27, 2018, 7 pgs.
Supplemental European Search Report. EP3241277, dated Jun. 13, 2018, 10 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultra-wideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Considerations with Dynamic Power Path Management, Mar./Apr. 2012 Issue, 8 pgs.

* cited by examiner

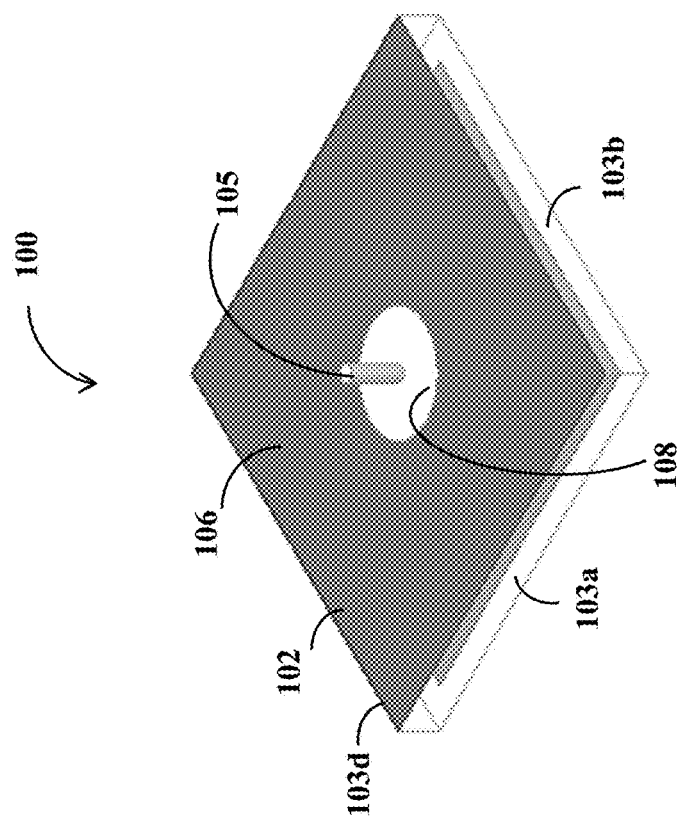
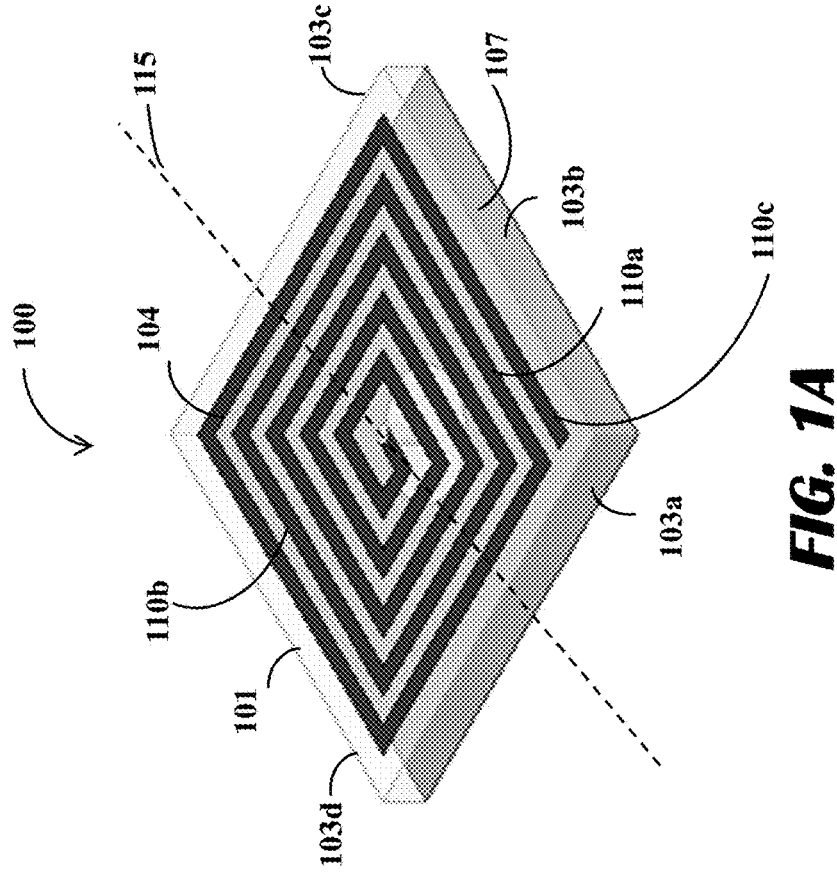

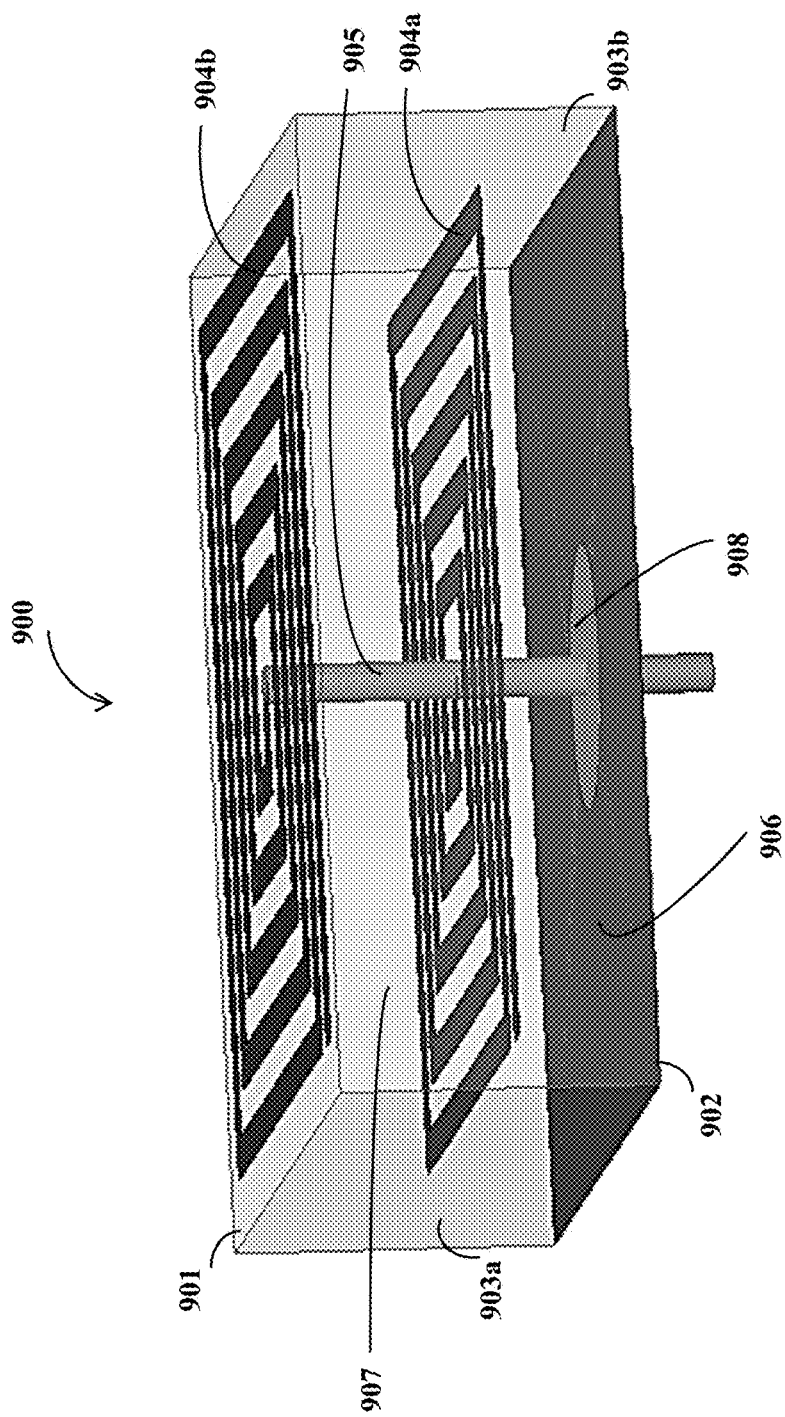

MINIATURIZED HIGHLY-EFFICIENT DESIGNS FOR NEAR-FIELD POWER TRANSFER SYSTEM

CROSS-REFERENCE TO RELATED APPLICATIONS

This non-provisional application claims priority to U.S. Provisional Application Ser. No. 62/374,578, filed Aug. 12, 2016 and entitled "Miniaturized Highly-Efficient Designs For Near-Field Power Transfer System," which is incorporated by reference herein in its entirety.

This non-provisional application is a continuation-in-part of U.S. application Ser. No. 15/046,348, filed Feb. 17, 2016 and entitled "Near Field Transmitters for Wireless Power Charging," which claims priority to U.S. Provisional Application 62/387,205, entitled "Near Field Transmitters for Wireless Power Charging," filed Dec. 24, 2015, each of which is incorporated by reference herein in its entirety.

TECHNICAL FIELD

This application relates generally to wireless power charging systems and more particularly to near-field radio frequency (RF) antennas for transmitting or receiving power.

BACKGROUND

Electronic devices, such as laptop computers, smartphones, portable gaming devices, tablets, or others, require power to operate. As generally understood, electronic devices are often charged at least once a day, or in high-use or power-hungry electronic devices, more than once a day. Such activity may be tedious and may present a burden to users. For example, a user may be required to carry chargers in case his electronic devices run out of power. In addition, some users have to find available power sources to connect to, which is inconvenient and time consuming. Lastly, some users must plug into a wall or some other power supply to be able to charge their electronic devices. Such activity may render electronic devices inoperable or not portable during charging.

Some conventional solutions include an inductive charging pad, which may employ magnetic induction or resonating coils. As understood in the art, such a solution still requires the electronic devices to: (i) be placed in a specific location on the inductive charging pad, and (ii) be particularly oriented for powering due to magnetic fields having a particular orientation. Furthermore, inductive charging units require large coils in both devices (i.e., the charger and the device being charged by the charger), which may not desirable due to size and cost, for example. Therefore, electronic devices may not sufficiently charge or may not receive a charge if not oriented properly on the inductive charging pad. And, users can be frustrated when an electronic device is not charged as expected after using a charging mat, thereby destroying the credibility of the charging mat.

Other solutions use far field RF wave transmission to create pockets of energy by constructive interference of RF waves at remote locations for charging a device. Such solutions, however, are better suited for particular uses and configurations as far field RF wave transmission solutions typically use numerous antenna arrays and circuitry for providing phase and amplitude control of the RF waves. Furthermore, far field antennas may not be efficient for near-field charging systems. Some antennas such as patch antennas have been used for near-field power transfer. However, the patch antennas also have low power transfer efficiency in near-field, particularly as the generated power may leak in all directions, rather than being concentrated in a particular area in near-field.

Therefore, there is a need in the art to address the above described drawbacks of far field antennas and near field antennas and construct near RF field antennas with high coupling efficiency.

SUMMARY

Systems disclosed herein address the aforementioned issues and may provide a number other benefits as well.

In one embodiment, a near-field radio frequency (RF) power transfer system, comprises: a first antenna element disposed on or below a first surface of a substrate and configured to carry a first current in a first direction during a first time period to generate a first RF radiation; a second antenna element disposed on or below the first surface of the substrate and configured to carry a second current in a second direction opposite to the first direction during the first time period to generate a second RF radiation such that the far-field portion of the second RF radiation cancels the far-field portion of the first RF radiation; and a ground plane disposed on or below a second surface of the substrate, wherein the second surface is opposite to the first surface.

In one embodiment, a method of near-field RF power transfer, the method comprises: supplying, through one or more vias through a ground plane, a first current to a first antenna element such that the first antenna generates a first RF radiation and a second current to a second antenna element such that the second antenna generates a second RF radiation, wherein the first current is in a first direction and the second current is in a second direction opposite to the first direction such that the far-field portion of the second RF radiation cancels the far field portion of the first RF radiation, wherein the first and second antenna elements are disposed on or below a first surface of a substrate, and wherein the ground plane is disposed on or below a second surface of the substrate opposite to the first surface and below the first and second antenna elements.

BRIEF DESCRIPTION OF THE DRAWINGS

The accompanying drawings constitute a part of this specification and illustrate embodiments of the subject matter disclosed herein.

FIGS. 1A and 1B are schematic illustrations of an exemplary system, according to an embodiment.

FIGS. 9A and 9B are schematic illustrations of an exemplary system, according to an embodiment.

DETAILED DESCRIPTION

Figure 2A:
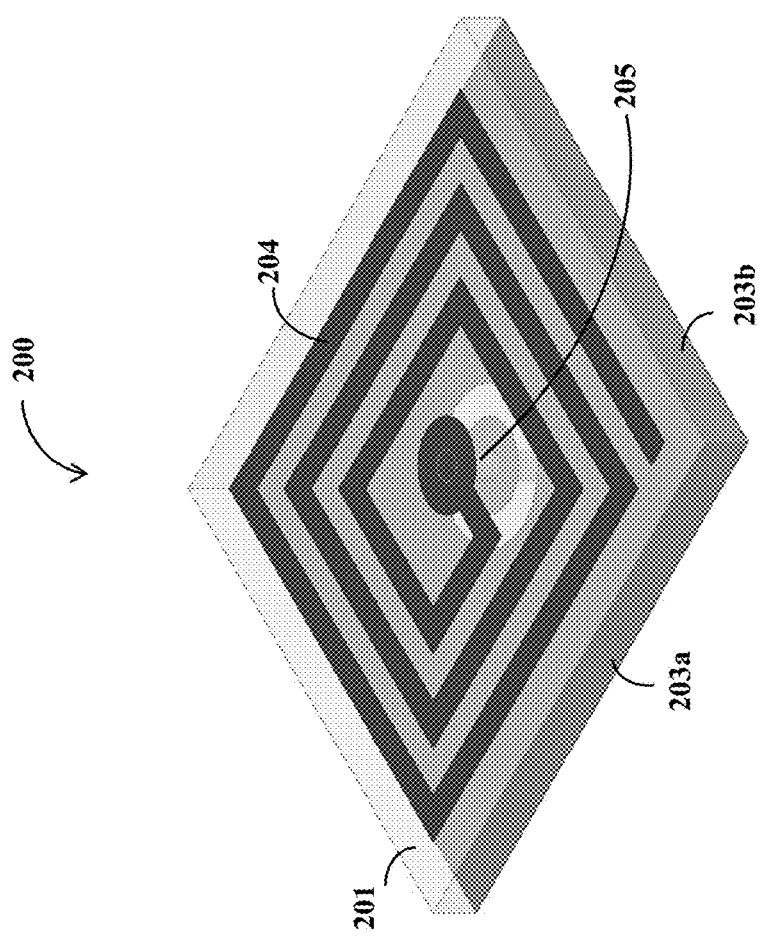
FIGS. 2A-2D are schematic illustrations of an exemplary system, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Disclosed herein are various embodiments of power transmission systems with high power transfer efficiency in near-field, RF-based, power transfer coupling. Power transfer efficiency of a transmitter and a receiver in a power transfer system may be defined as percentage or ratio that relates the amount of power transmitted or produced by a transmitter and the amount of power collected by a receiver. Power transfer efficiency may depend upon the coupling of the transmitter and the receiver. If the transmitter and the receiver are well-coupled, most of the power transmitted by one or more transmit antennas of the transmitter is localized at one or more receive antennas of the receiver. On the other hand, if the transmitter and the receiver are not coupled well, relatively less power is localized at the receiver antennas, and the power is lost due to leakage in undesired directions. It is therefore desirable to have better-coupled power transmitters and receivers, wherein most of the electromagnetic power is trapped or otherwise localized between the transmitter and the receiver.

The embodiments of near-field power transfer systems described herein may include antenna elements that are constructed or printed close to each other in a meandered arrangement. In a meandered arrangement, neighboring antenna elements conduct currents that flow in opposite directions. This current flow entirely or almost entirely cancels out any far field RF radiation generated by the antennas or otherwise generated by the electromagnetic effects of the current flow. In other words, for a first current flowing in a first path, there may be a second current flowing in a second cancellation path that cancels the far field radiation produced by the first current flowing in the first path. Therefore, there may be no radiation of power to the far field. Such cancellation, however, may not occur in a near-field active zone, where the transfer of power may occur between the transmitter and the receiver. One having ordinary skill in the art will appreciate that one or more solutions to Maxwell's equations for time-varying electric fields and magnetic fields generated by the currents flowing in opposite directions, will dictate that far-field electromagnetic radiation will be canceled and that near-field electromagnetic radiation will not be canceled when currents flow in opposite directions. One ordinarily skilled in the art should also appreciate that a near-field active zone is defined by the presence of electromagnetic power in the immediate vicinity, proximate or adjacent to, the power transfer system. One ordinarily skilled in the art will further appreciate the near-field/far-field distinction. For example, near-field may refer to the immediate vicinity of the antenna elements, and may also include the radiating near field (Fresnel) region, and far-field may refer to areas beyond the immediate vicinity of the antenna elements.

The embodiments of the near-field power transfer systems described herein may include a ground plane behind the antennas. For a near-field power transfer system functioning as a transmitter, the ground plane may not allow power to be transferred behind the transmit antennas of the power transfer system by, for example, acting as a reflector for the electromagnetic waves generated by the transmitter antennas. Similarly, for a near-field power transfer system functioning as a receiver, the ground plane may not allow the received electromagnetic waves to radiate from the back of the receiver. Therefore, having one or more ground planes may localize or trap the electromagnetic power in between the transmitter and the receiver by blocking the leakage of power from the back of the transmitter and/or the receiver.

The antennas may be constructed to be in different shapes such as monopoles, meandered monopoles, dipoles, meandered dipoles, spirals, loops, and concentric loops. The antennas may also be constructed in hybrid configurations such as spiral dipoles. Furthermore, there may be hierarchical antennas, for example, an antenna with a first spiral dipole at a first hierarchical level and a second spiral dipole at a second hierarchical level above the first hierarchical level. In some embodiments, a single ground plane may be provided at the lowest hierarchical level. In other embodiments, each hierarchical level may include a ground plane. The hybrid structures or the hierarchical structures may be required for wideband and/or multiband designs. For example, a non-hierarchical or non-hybrid structure may be highly efficient at a first frequency and at a first distance between the transmitter and the receiver, but may be inefficient other frequencies and distances. Incorporating more complex structure such as hybrids and hierarchies allows for higher efficiencies along a range of frequencies and distances.

In some embodiments, the transmit antenna and the corresponding receive antenna may have to be mirror images of or symmetric to each other. In other words, a receive antenna may have the same or roughly the same shape and/or size configuration as a corresponding transmit antenna. Such mirroring may ensure better coupling and therefore result in higher power transfer efficiency. However, in other embodiments, the transmit antennas and the receive antennas may not have to be symmetric to each other. Furthermore, for non-mirror pairings, the antennas disclosed herein may be paired with other antennas (e.g. patches, dipoles, slots); in these cases the near-field coupling efficiency may be still acceptable for certain applications. Different types of transmit antennas may be mixed and matched with different types of receive antennas.

As the frequency decreases and the wavelength increases, in conventional systems, the matching antennas may have to be made longer and longer. Embodiments of the near-field power transfer systems described herein may also provide miniaturized antennas. For example, in many conventional systems, a half wave-dipole antenna used to transmit and/or receive 900 MHz electromagnetic waves is typically 33.3 centimeters (cm) or roughly 1 foot (ft) from one end of the antenna to the other end of the antenna. But embodiments described herein may achieve such results using smaller form-factors. A meandered arrangement disclosed herein may allow the antennas to be folded or spiraled onto each other. A long antenna can therefore may be printed or constructed in a relatively smaller housing. For example, transmitters/receivers operating at very low frequencies, for example 400 MHz, may be miniaturized to antenna sizes from about 6 millimeter (mm) by 6 mm to about 14 mm by 14 mm. Furthermore, the near-field power transfer systems disclosed herein have significantly higher power transfer efficiencies compared to the transmitters and receivers known in the art.

The near-field power transfer systems disclosed herein may be used in electronic devices, such as mobile phones, wearables, and toys. For example, a first power transfer system may be a part of or associated with a transmitter embedded within a charging mat, and a second power transfer system may be a part of or associated with a receiver embedded within a mobile phone. When the mobile phone is placed in proximity to the charging mat, the transmitter may transfer power to the receiver. In some embodiments, the near-field power transfer systems may be used in conjunction with far field power transfer systems. For instance, a mobile phone may have both a near-field receiver and a far field receiver. When the mobile phone is placed on a charging mat having a near-field transmitter, the near-field receiver in the mobile phone may receive power from the near-field transmitter. When the mobile phone is taken off from the charging mat and placed on a different location, the far field receiver in the mobile phone may receive power from a far field transmitter.

FIG. 1A shows a top perspective view of a schematic drawing of an exemplary near-field power transfer system 100. FIG. 1B shows a bottom perspective view of a schematic drawing of an exemplary near-field power transfer system 100. The power transfer system 100 may comprise a top surface 101, a bottom surface 102, and sidewalls 103. In some embodiments, a housing containing components of the power transfer system 100 may be constructed of a material creating minimal obstructions for electromagnetic waves to pass through. In other embodiments, different portions of the housing may be constructed with materials having different electromagnetic properties such as permeability and permittivity. For example, the top surface 101 may allow electromagnetic waves to pass through with minimal obstruction while the sidewalls 103 may obstruct electromagnetic waves by attenuation, absorption, reflection, or other techniques known in the art.

The power transfer system 100 may radiate RF energy and thus transfer power when the power transfer system 100 is adjacent to a second power transfer system (not shown). As such, a power transfer system 100 may be on a "transmit side," so as to function as a power transmitter, or the power transfer system 100 may be on a "receive side," so as to function as a power receiver. In some embodiments, where the power transfer system 100 is associated with a transmitter, the power transfer system 100 (or subcomponents of the power transfer system 100) may be integrated into the transmitter device, or may be externally wired to the transmitter. Likewise, in some embodiments, where the power transfer system 100 is associated with a receiver, the power transfer system 100 (or subcomponents of the power transfer system 100) may be integrated into the receiver device, or may be externally wired to the receiver.

A substrate 107 may be disposed within a space defined between the top surface 101, sidewalls 103, and the bottom surface 102. In some embodiments, the power transfer system 100 may not include a housing and the substrate 107 may include the top surface 101, sidewalls 103, and the bottom surface 102. The substrate 107 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may generate radiation, and may act as thin reflectors.

An antenna 104 may be constructed on or below the top surface 101. When the power transfer system 100 is associated with a power transmitter, the antenna 104 may be used for transmitting electromagnetic waves. Alternatively, when the power transfer system 100 is associated with a power receiver, the antenna 104 may be used for receiving electromagnetic waves. In some embodiments, the power transfer system 100 may operate as a transceiver and the antenna 104 may both transmit and receive electromagnetic waves. The antenna 104 may be constructed from materials such as metals, alloys, metamaterials and composites. For example, the antenna 104 may be made of copper or copper alloys. The antenna 104 may be constructed to have different shapes based on the power transfer requirements. In the exemplary system 100 shown in FIG. 1A and FIG. 1B, the antenna 104 is constructed in a shape of a spiral including antenna segments 110 that are disposed close to each other. The currents flowing through the antenna segments 110 may be in opposite directions. For example, if the current in the antenna segment 110b is flowing from left to right of FIG. 1A, the current each of the antenna segments 110a, 110c may be flowing from right to left. The opposite flow of the current results in mutual cancellation of the electromagnetic radiation the far field of the power transfer system 100. In other words, the far field electromagnetic radiation generated by one or more antenna segments 110 left of an imaginary line 115 is cancelled out by the far field electromagnetic radiation generated by one or more antenna segments 110 right of the line 115. Therefore, there may be no leakage of power in the far field of the power transfer system 100. Such cancellation, however, may not occur in a near-field active zone of the power transfer system 100, where the transfer of power may occur.

The power transfer system 100 may include a ground plane 106 at or above the bottom surface 102. The ground plane 106 may be formed by materials such as metal, alloys, and composites. In an embodiment, the ground plane 106 may be formed by copper or a copper alloy. In some embodiments, the ground plane 106 may be constructed of a solid sheet of material. In other embodiments, the ground plane 106 may be constructed using material strips arranged in shapes such as loops, spirals, and meshes. A via 105 carrying a power feed line (not shown) to the antenna may pass through the ground plane 106. The power feed line may supply current to the antenna 104. In some embodiments, the ground plane 106 may be electrically connected to the antenna 104. In some embodiments, the ground plane 106 may not be electrically connected to the antenna 104. For such implementations, an insulation area 108 to insulate the via 105 from the ground plane 106 may be constructed between the via 105 and the ground plane 106. In some embodiments, the ground plane 106 may act as a reflector of the electromagnetic waves generated by the antenna 104. In other words, the ground plane may not allow electromagnetic transmission beyond the bottom surface of the power transfer system 100 by cancelling and/or reflecting the transmission image formed beyond the bottom surface. Reflecting the electromagnetic waves by the ground plane may reinforce the electromagnetic waves transmitted by the antenna 104 from or towards the top surface 101. Therefore, there may be no leakage of electromagnetic power from the bottom surface 102.

Therefore, as a result of the antenna 104 and the ground plane 106, the electromagnetic waves transmitted or received by the power transfer system 100 accumulate in the near field of the system 100. The leakage to the far field of the system 100 is minimized.

FIG. 2A schematically illustrates a top perspective view of an exemplary near-field power transfer system 200, according to an embodiment of the disclosure. In some embodiments, the power transfer system 200 may be a part of or associated with a power transmitter. In other embodiments, the power transfer system 200 may be a part of or associated with a power receiver. The power transfer system 200 may comprise a housing defined by a top surface 201, a bottom surface (not shown), and sidewalls 203. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 201 may allow electromagnetic waves to pass through with minimal obstruction while the sidewalls 203 may obstruct electromagnetic waves by attenuation, absorption, reflection, or other techniques known in the art.

A substrate 207 may be disposed within a space defined between the top surface 201, sidewalls 203, and the bottom surface 202. In some embodiments, the power transfer system 200 may not include a housing and the substrate 207 may include the top surface 201, sidewalls 203, and the bottom surface 202. The substrate 207 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may generate radiation, and may act as thin reflectors.

An antenna 204 may be constructed on or below the top surface 201. When the power transfer system 200 is a part of or associated with a power transmitter, the antenna 204 may be used for transmitting electromagnetic waves. Alternatively, when the power transfer system 200 is a part of or associated with a power receiver, the antenna 204 may be used for receiving electromagnetic waves. In some embodiments, the power transfer system 200 may operate as a transceiver and the antenna 204 may both transmit and receive electromagnetic waves. The antenna 204 may be constructed from materials such as metals, alloys, metamaterials, and composites. For example, the antenna 204 may be made of copper or copper alloys. The antenna 204 may be constructed to have different shapes based on the power transfer requirements. In the exemplary system 200 shown in FIG. 2A the antenna 204 is constructed in a shape of a spiral including antenna segments which are disposed close to each other. A signal feed line (not shown) may be connected to the antenna 204 through a via 205.

Figure 2C:
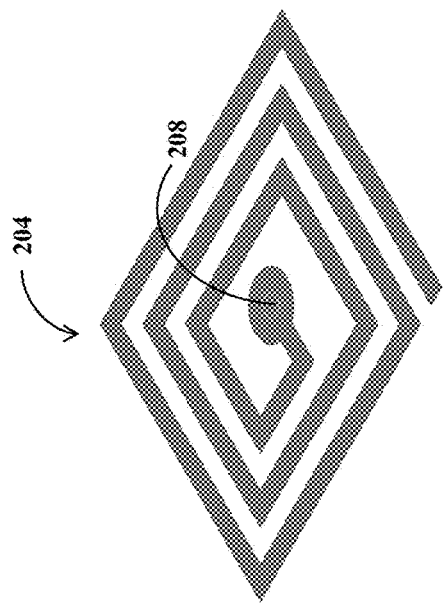
Figure 2D:
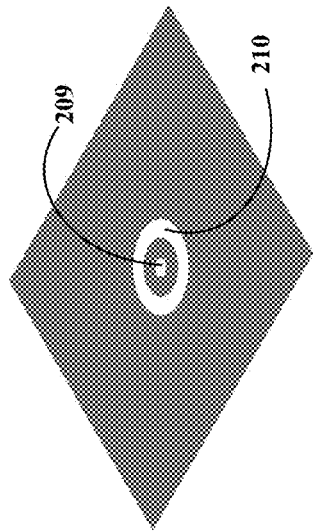
Figure 2B:
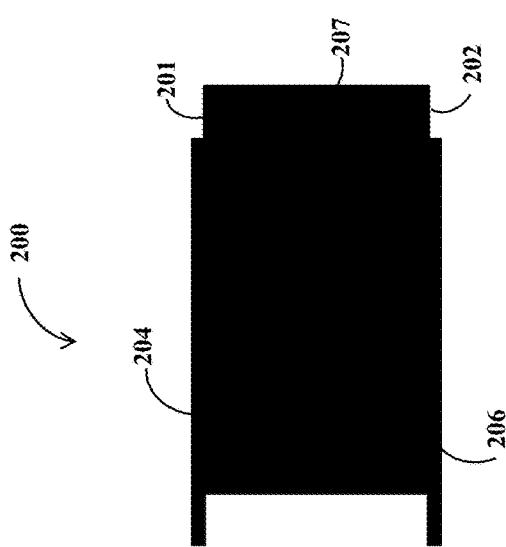

FIG. 2B schematically illustrates a side view of the exemplary power transmission system 200. As shown, an upper metal layer may form the antenna 204, and a lower metal layer may form the ground plane 206. The substrate 207 may be disposed in between the upper and lower metal layer. The substrate 207 may include materials such as FR4, metamaterials, or any other materials known in the art. The metamaterials may be a broad class of synthetic materials that are engineered to yield desirable magnetic permeability and electrical permittivity. At least one of the magnetic permeability and electrical permittivity may have to be based upon power-transfer requirements, and/or compliance constraints for government regulations. The metamaterials disclosed herein may receive radiation or generate radiation, and may act as thin reflectors.

FIG. 2C schematically illustrates a top perspective view of antenna 204. The antenna 204 comprises a connection point 209 for a feed line (not shown) coming through the via 205. FIG. 2D schematically illustrates a side perspective view of the ground plane 206. In an embodiment, the ground plane 206 comprises a solid metal layer. In other embodiments, the ground plane 206 may include structures such as stripes, meshes, and lattices and may not be completely solid. The ground plane 206 may also comprise a socket 209 for the via 205 to pass through. Around the socket 209, the ground plane 206 may also include an insulating region 210 to insulate the socket 209 from the rest of the ground plane 206. In some embodiments, the ground plane may have an electrical connection to a line coming through the via, and the insulating region 210 may not be required.

Figure 3:
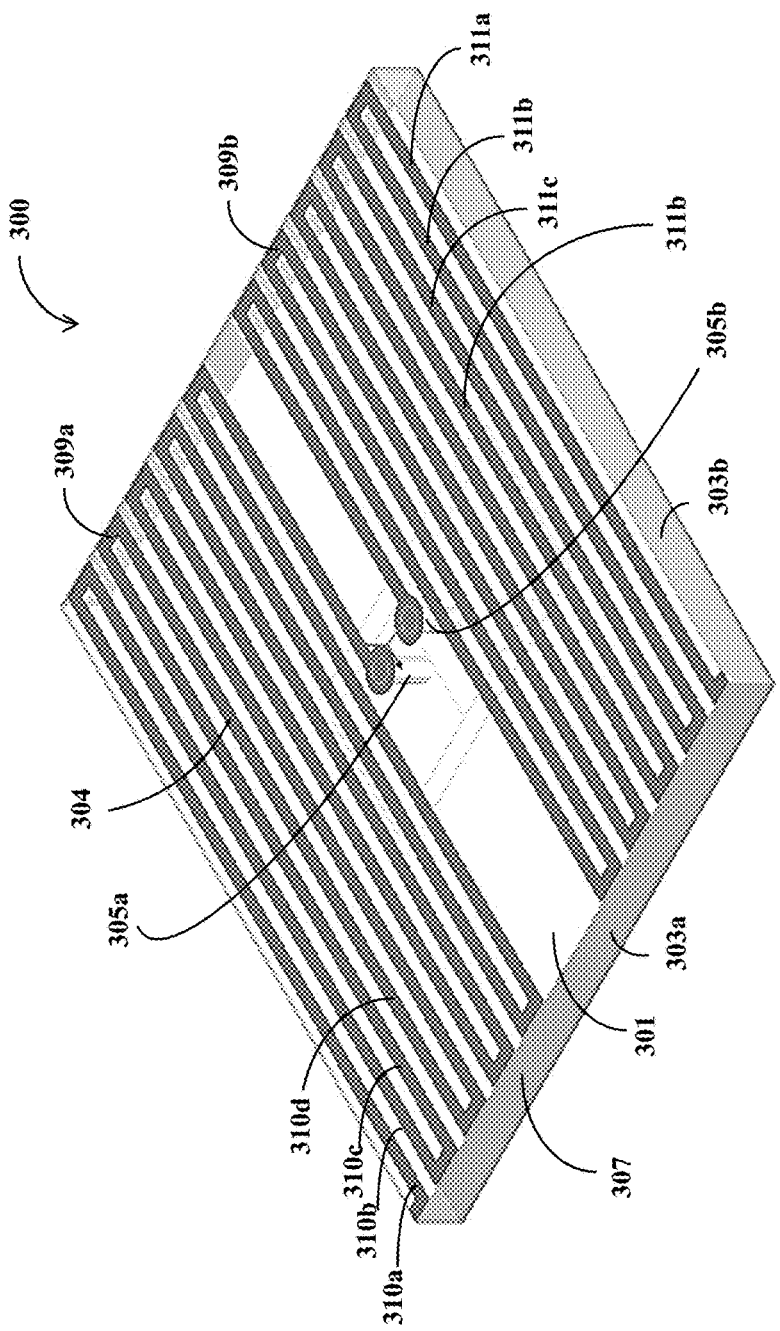
FIG. 3 is a schematic illustration of an exemplary system, according to an embodiment.

FIG. 3 schematically illustrates a top perspective view of an exemplary near-field power transfer system 300, according to an embodiment of the disclosure. In some embodiments, the power transfer system 300 may be a part of or associated with a power transmitter. In other embodiments, the power transfer system 300 may be a part of or associated with a power receiver. The power transfer system 300 may comprise a housing defined by a top surface 301, a bottom surface (not shown), and sidewalls 303. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 301 may allow electromagnetic waves to pass through with minimal obstruction while the sidewalls 303 may obstruct electromagnetic waves by attenuation, absorption, reflection, or other techniques known in the art.

A substrate 307 may be disposed within a space defined between the top surface 301, sidewalls 303, and the bottom surface 302. In some embodiments, the power transfer system 300 may not include a housing and the substrate 307 may include the top surface 301, sidewalls 303, and the bottom surface 302. The substrate 307 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

An antenna 304 may be constructed on or below the top surface 3. When the power transfer system 300 is a part of or associated with a power transmitter, the antenna 304 may be used for transmitting electromagnetic waves. Alternatively, when the power transfer system 300 is a part of or associated with a power receiver, the antenna 304 may be used for receiving electromagnetic waves. In some embodiments, the power transfer system 300 may operate as a transceiver and the antenna 304 may both transmit and receive electromagnetic waves. The antenna 304 may be constructed from materials such as metals, alloys, metamaterials and composites. For example, the antenna 304 may be made of copper or copper alloys. The antenna 304 may be constructed to have different shapes based on the power transfer requirements. In the exemplary system 300 shown in FIG. 3, the antenna 304 is constructed in a shape of a dipole including a first meandered pole 309a and a second meandered pole 309b. A first power feed line (not shown) to the first meandered pole 309a may be carried by a first via 305a and a second power feed line (not shown) to the second meandered pole 309b may be carried by a second via 305b. The first power feed line may supply current to the first meandered pole 309a and the second power feed line may supply current to the second meandered pole 309b. The first meandered pole 309a includes antenna segments 310 which are disposed close to each other and the second meandered pole 309b includes antenna segments 311 also disposed close to each other. The currents flowing through the neighboring antenna segments 310, 311 may be in opposite directions. For example, if the current in a antenna segment 310b is flowing from left to right of FIG. 3, the current in each of the antenna segments 310a, 310c may be flowing from right to left. The opposite flow of the current across any number of antenna segments 310 of the power transfer system 300 results in mutual cancellation of the far field electromagnetic radiation generated by the power transfer system 300. Additionally or alternatively, the far field electromagnetic radiation generated by the antenna segments 310 of the first pole 309a may be cancelled by the electromagnetic radiation generated by antenna segments 311 of the second pole 309b. It should be appreciated that the far field cancellation may occur across any number of segments 310, 311 and/or across any number of poles 309. Therefore, there may be no leakage of power in the far field of the power transfer system 300. Such cancellation, however, may not occur in a near-field active zone of the power transfer system 300, where the transfer of power may occur.

The power transfer system 300 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The vias 305 carrying the power feed lines to the antenna may pass through the ground plane. In some embodiments, the ground plane may be electrically connected to the antenna. In some embodiments, the ground plane may not be electrically connected to the antenna 304. For such implementations, an insulation area to insulate the vias 305 from the ground plane may be constructed between the vias 305 and the ground plane. In some embodiments, the ground plane may act as a reflector of the electromagnetic waves generated by the antenna 304. In other words, the ground plane may not allow electromagnetic transmission beyond the bottom surface of the power transfer system 300 by cancelling and/or reflecting the transmission image formed beyond the bottom surface. Reflecting the electromagnetic waves by the ground plane may reinforce the electromagnetic waves transmitted by the antenna 304 from or towards the top surface 301. Therefore, there may be no leakage of electromagnetic power from the bottom surface.

Figure 4:
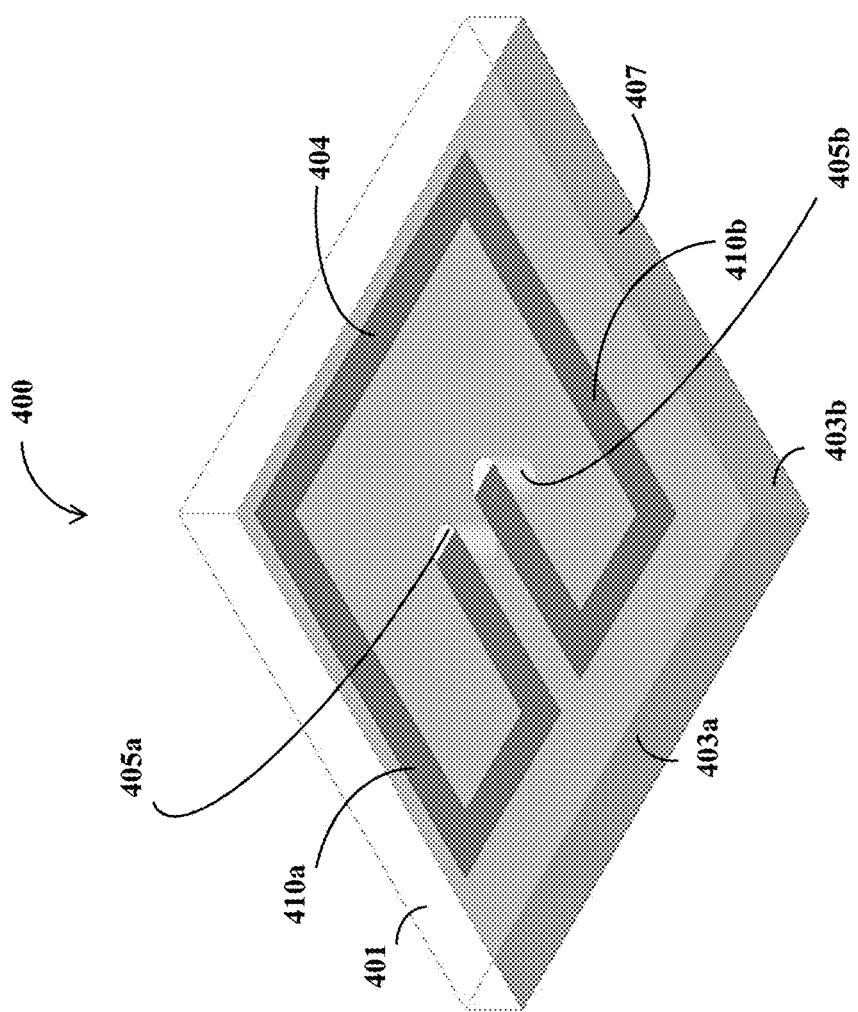
FIG. 4 is a schematic illustration of an exemplary system, according to an embodiment.

FIG. 4 schematically illustrates a top perspective view of an exemplary near-field power transfer system 400, according to an embodiment of the disclosure. In some embodiments, the power transfer system 400 may be a part of or associated with a power transmitter. In other embodiments, the power transfer system 400 may be a part of or associated with a power receiver. The power transfer system 400 may comprise a housing defined by a top surface 401, a bottom surface (not shown), and sidewalls 103. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 401 may allow electromagnetic waves to pass through with minimal obstruction while the sidewalls 403 may obstruct electromagnetic waves by attenuation, absorption, reflection, or other techniques known in the art.

A substrate 407 may be disposed within a space defined between the top surface 401, sidewalls 403, and the bottom surface 402. In some embodiments, the power transfer system 400 may not include a housing and the substrate 407 may include the top surface 401, sidewalls 403, and the bottom surface 402. The substrate 407 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may generate radiation, and may act as thin reflectors.

An antenna 404 may be constructed on or below the top surface 401. When the power transfer system 400 is a part of or associated with a power transmitter, the antenna 404 may be used for transmitting electromagnetic waves. Alternatively, when the power transfer system 400 is a part of or associated with a power receiver, the antenna 404 may be used for receiving electromagnetic waves. In some embodiments, the power transfer system 400 may operate as a transceiver and the antenna 404 may both transmit and receive electromagnetic waves. The antenna 404 may be constructed from materials such as metals, alloys, and composites. For example, the antenna 404 may be made of copper or copper alloys. The antenna 404 may be constructed to have different shapes based on the power transfer requirements. In the exemplary system 400 shown in FIG. 4, the antenna 404 is constructed in a shape of a loop including loop segments 410 which are disposed close to each other. The currents flowing through the neighboring loop segments 410 may be in opposite directions. For example, if the current in a first loop segment 410a is flowing from left to right of FIG. 4, the current in a second loop segment 410b may be flowing from right to left. The opposite flow of the current results in mutual cancellation of the electromagnetic radiation the far field of the power transfer system 400. Therefore, there may be no leakage of power in the far field of the power transfer system 400. Such cancellation, however, may not occur in a near-field active zone of the power transfer system 400, where the transfer of power may occur.

The power transfer system 400 may include a ground plane (not shown) at or above the bottom surface. The ground plane may be formed by materials such as metal, alloys, metamaterials, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The vias 405 carrying the power feed lines (not shown) to the antenna may pass through the ground plane. The power feed lines may provide current to the antenna 404. In some embodiments, the ground plane 106 may be electrically connected to the antenna. In some embodiments, the ground plane may not be electrically connected to the antenna 404. For such implementations, an insulation area to insulate the vias 405 from the ground plane may be constructed between the vias 305 and the ground plane. In some embodiments, the ground plane may act as a reflector of the electromagnetic waves generated by the antenna 404. In other words, the ground plane may not allow electromagnetic transmission beyond the bottom surface of the power transfer system 300 by cancelling and/or reflecting the transmission image formed beyond the bottom surface. Reflecting the electromagnetic waves by the ground plane may reinforce the electromagnetic waves transmitted by the antenna 404 from or towards the top surface 401. Therefore, there may be no leakage of electromagnetic power from the bottom surface.

Figure 5:
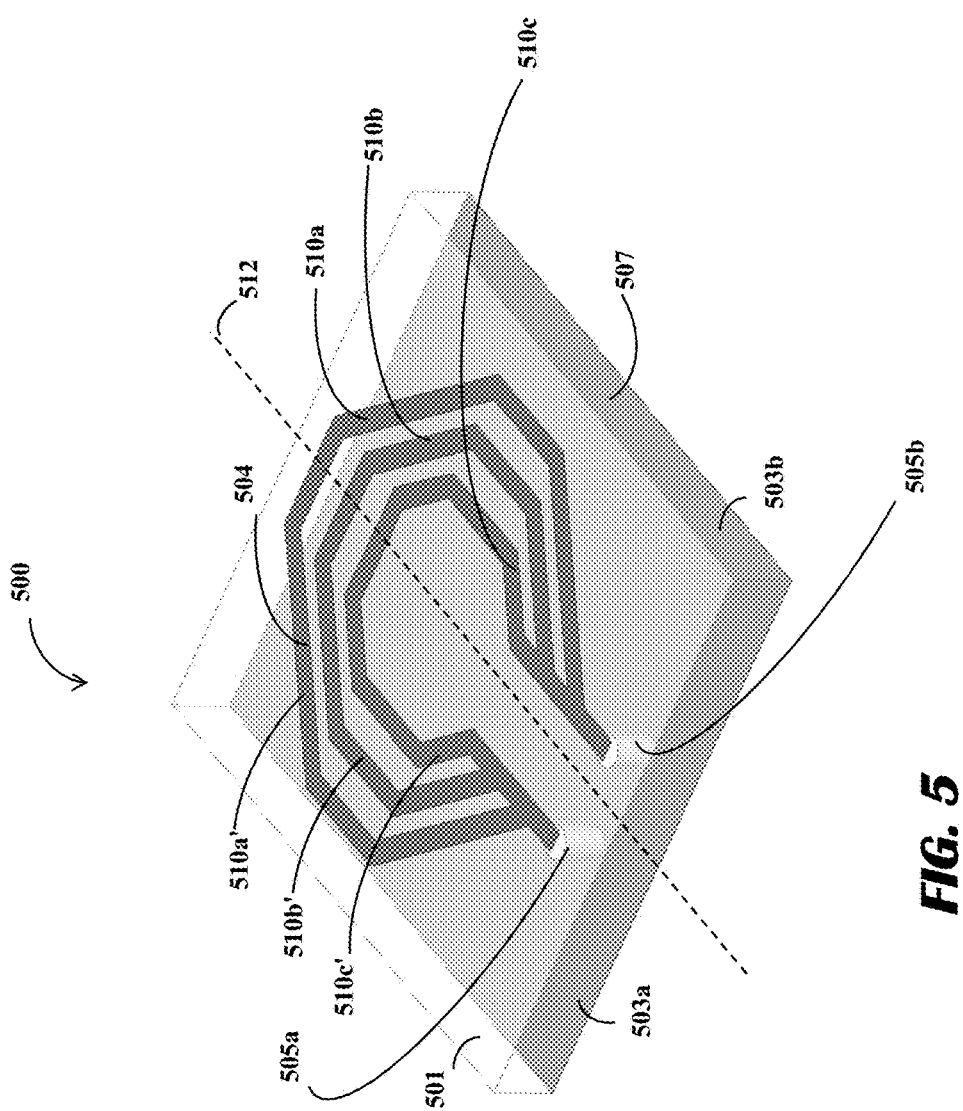
FIG. 5 is a schematic illustration of an exemplary system, according to an embodiment.

FIG. 5 schematically illustrates a top perspective view of an exemplary near-field power transfer system 500, according to an embodiment of the disclosure. In some embodiments, the power transfer system 500 may be a part of or associated with a power transmitter. In other embodiments, the power transfer system 500 may be a part of or associated with a power receiver. In other embodiments, the power transfer system 500 may be a part of or associated with a transceiver. The power transfer system 500 may comprise a housing defined by a top surface 501, a bottom surface (not shown), and sidewalls 503. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 501 may allow electromagnetic waves to pass through with minimal obstruction while the sidewalls 503 may obstruct electromagnetic waves by attenuation, absorption, reflection, or other techniques known in the art.

A substrate 507 may be disposed within a space defined between the top surface 501, sidewalls 503, and the bottom surface 502. In some embodiments, the power transfer system 500 may not include a housing and the substrate 507 may include the top surface 501, sidewalls 503, and the bottom surface 502. The substrate 507 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

An antenna 504 may be constructed on or below the top surface 501. When the power transfer system 500 is a part of or associated with a power transmitter, the antenna 504 may be used for transmitting electromagnetic waves. Alternatively, when the power transfer system 500 is a part of or associated with a power receiver, the antenna 504 may be used for receiving electromagnetic waves. In some embodiments, the power transfer system 500 may operate as a transceiver and the antenna 504 may both transmit and receive electromagnetic waves. The power feed lines (not shown) to the antenna 504 may be carried by the vias 505. The power feed lines may provide current to the antenna 504. The antenna 504 may be constructed from materials such as metals, alloys, metamaterials, and composites. For example, the antenna 504 may be made of copper or copper alloys. The antenna 504 may be constructed to have different shapes based on the power transfer requirements. In the exemplary system 500 shown in FIG. 5, the antenna 504 is constructed in a shape of concentric loops including antenna segments 510 which are disposed close to each other. As shown in FIG. 5, a single concentric loop may include two of the antenna segments 510. For example, the innermost loop may include a first antenna segment 510c to the right of an imaginary line 512 roughly dividing the loops into two halves, and a corresponding second antenna segment 510c' to the left of the imaginary line 512. The currents flowing through the neighboring antenna segments 510 may be in opposite directions. For example, if the current in the antenna segments 510a', 510b', 510c' is flowing from left to right of FIG. 5, the current in each of the antenna segments 510a, 510b, 510c may be flowing from right to left. The opposite flow of the current results in mutual cancellation of the electromagnetic radiation at the far field of the power transfer system 500. Therefore, there may be no transfer of power to the far field of the power transfer system 500. Such cancellation, however, may not occur in a near-field active zone of the power transfer system 500, where the transfer of power may occur. One ordinarily skilled in the art will appreciate the cancellation of electromagnetic radiation in the far field and absence of such cancellation in the near-field is dictated by one or more solutions of Maxwell's equations for time-varying electric and magnetic fields generated by the currents flowing in opposite directions. One ordinarily skilled in the art should further appreciate the near field active zone is defined by the presence of electromagnetic power in the immediate vicinity of the power transfer system 500.

The power transfer system 500 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The vias 505 carrying the power feed lines to the antenna may pass through the ground plane. In some embodiments, the ground plane may be electrically connected to the antenna. In some embodiments, the ground plane may not be electrically connected to the antenna 504. For such implementations, an insulation area to insulate the vias 505 from the ground plane may be constructed between the vias 305 and the ground plane. In some embodiments, the ground plane may act as a reflector of the electromagnetic waves generated by the antenna 504. In other words, the ground plane may not allow electromagnetic transmission beyond the bottom surface of the power transfer system 500 by cancelling and/or reflecting the transmission image formed beyond the bottom surface. Reflecting the electromagnetic waves by the ground plane may reinforce the electromagnetic waves transmitted by the antenna 504 from or towards the top surface 501.

Therefore, there may be no leakage of electromagnetic power from the bottom surface.

Figure 6:
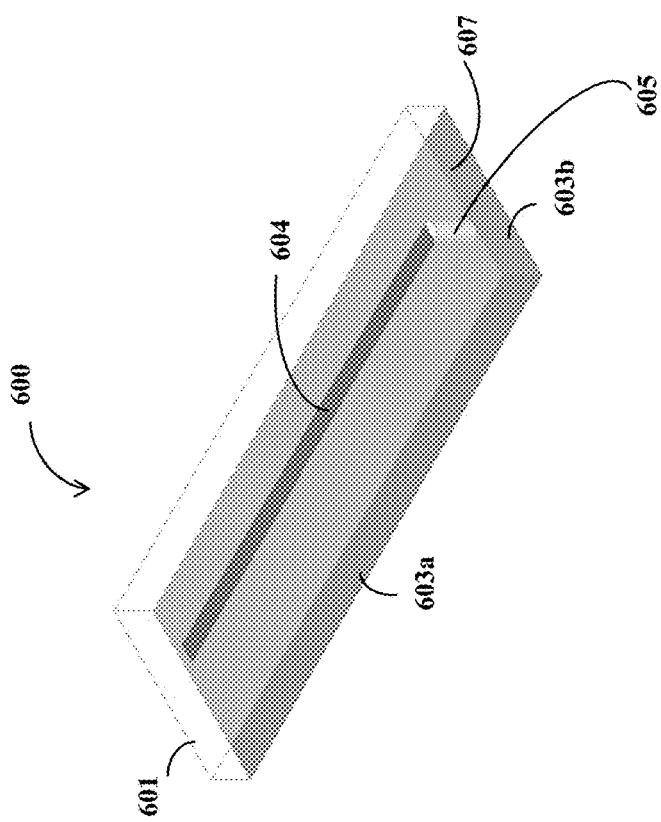
FIG. 6 is a schematic illustration of an exemplary system, according to an embodiment.

FIG. 6 schematically illustrates a top perspective view of an exemplary near-field power transfer system 600, according to an embodiment of the disclosure. In some embodiments, the power transfer system 600 may be a part of or associated with a power transmitter. In other embodiments, the power transfer system 600 may be a part of or associated with a power receiver. The power transfer system 600 may comprise a housing defined by a top surface 601, a bottom surface (not shown), and sidewalls 603. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 601 may allow electromagnetic waves to pass through with minimal obstruction while the sidewalls 603 may obstruct electromagnetic waves by attenuation, absorption, reflection, or other techniques known in the art.

A substrate 607 may be disposed within a space defined between the top surface 601, sidewalls 603, and the bottom surface 602. In some embodiments, the power transfer system 600 may not include a housing and the substrate 607 may include the top surface 601, sidewalls 603, and the bottom surface 602. The substrate 607 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

An antenna 604 may be constructed on or below the top surface 601. When the power transfer system 600 is a part of or associated with a power transmitter, the antenna 604 may be used for transmitting electromagnetic waves. Alternatively, when the power transfer system 600 is a part of or associated with a power receiver, the antenna 604 may be used for receiving electromagnetic waves. In some embodiments, the power transfer system 600 may operate as a transceiver and the antenna 604 may both transmit and receive electromagnetic waves. The antenna 604 may be constructed from materials such as metals, alloys, and composites. For example, the antenna 604 may be made of copper or copper alloys. The antenna 604 may be constructed to have different shapes based on the power transfer requirements. In the exemplary system 600 shown in FIG. 6, the antenna 604 is constructed in a shape of a monopole. A via 605 may carry a power feed line (not shown) to the antenna 604. The power feed line may provide current to the antenna 604.

The power transfer system 600 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The via 605 carrying the power feed line to the antenna 604 may pass through the ground plane. In some embodiments, the ground plane may be electrically connected to the antenna. In some embodiments, the ground plane may not be electrically connected to the antenna 604. For such implementations, an insulation area to insulate the via 605 from the ground plane may be constructed between the via 605 and the ground plane. In some embodiments, the ground plane may act as a reflector of the electromagnetic waves generated by the antenna 604. In other words, the ground plane may not allow electromagnetic transmission beyond the bottom surface of the power transfer system 600 by cancelling and/or reflecting the transmission image formed beyond the bottom surface. Reflecting the electromagnetic waves by the ground plane may reinforce the electromagnetic waves transmitted by the antenna 604 from or towards the top surface 601. Therefore, there may be no leakage of electromagnetic power from the bottom surface.

Figure 7:
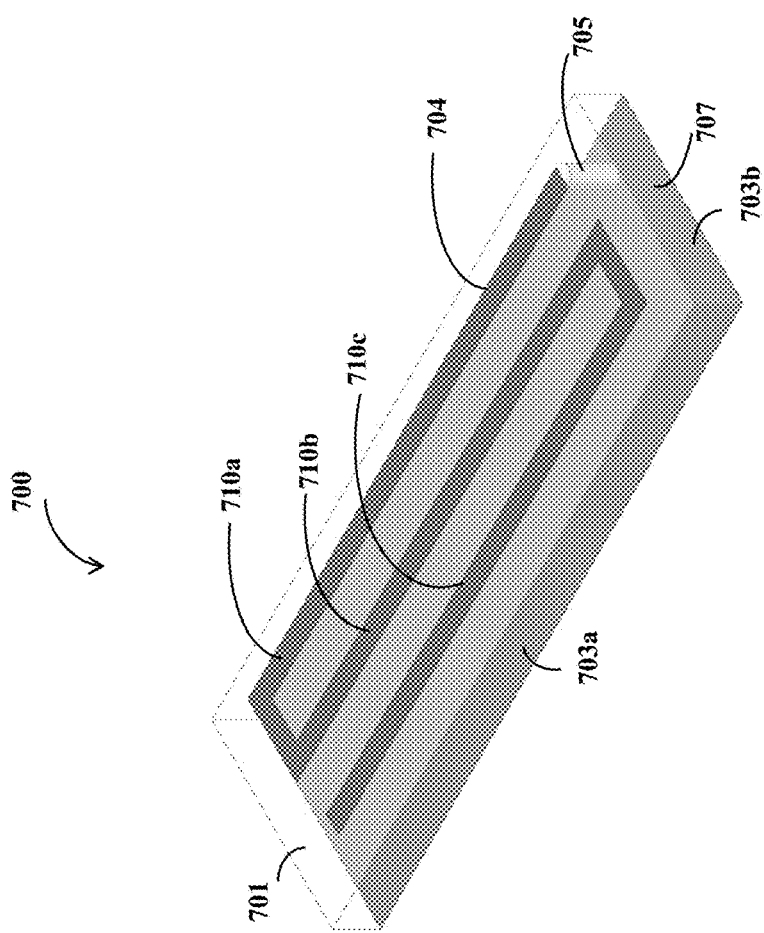
FIG. 7 is a schematic illustration of an exemplary system, according to an embodiment.

FIG. 7 schematically illustrates a top perspective view of an exemplary near-field power transfer system 700, according to an embodiment of the disclosure. In some embodiments, the power transfer system 700 may be a part of or associated with a power transmitter. In other embodiments, the power transfer system 700 may be a part of or associated with a power receiver. The power transfer system 700 may comprise a housing defined by a top surface 701, a bottom surface (not shown), and sidewalls 103. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 701 may allow electromagnetic waves to pass through with minimal obstruction while the sidewalls 703 may obstruct electromagnetic waves by attenuation, absorption, reflection, or other techniques known in the art.

A substrate 707 may be disposed within a space defined between the top surface 701, sidewalls 703, and the bottom surface 702. In some embodiments, the power transfer system 700 may not include a housing and the substrate 707 may include the top surface 701, sidewalls 703, and the bottom surface 702. The substrate 707 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

An antenna 704 may be constructed on or below the top surface 701. When the power transfer system 700 is a part of or associated with a power transmitter, the antenna 704 may be used for transmitting electromagnetic waves. Alternatively, when the power transfer system 700 is a part of or associated with a power receiver, the antenna 704 may be used for receiving electromagnetic waves. In some embodiments, the power transfer system 700 may operate as a transceiver and the antenna 704 may both transmit and receive electromagnetic waves. The antenna 704 may be constructed from materials such as metals, alloys, and composites. For example, the antenna 704 may be made of copper or copper alloys. A via 705 may carry a power feed line (not shown) to the antenna. The power feed line may provide current to the antenna 704. The antenna 704 may be constructed to have different shapes based on the power transfer requirements. In the exemplary system 700 shown in FIG. 7, the antenna 704 is constructed in a shape of a monopole including antenna segments 710 placed close to each other. The currents flowing through the neighboring antenna segments 710 may be in opposite directions. For example, if the current in the antenna segment 710*b* is flowing from left to right of FIG. 7, the current each of the antenna segments 710*a*, 710*c* may be flowing from right to left. The opposite flow of the current results in mutual cancellation of the electromagnetic radiation in the far field of the power transfer system 700. Therefore, there may be no transfer of power in the far field of the power transfer system 700. Such cancellation, however, may not occur in a near-field active zone of the power transfer system 700, where the transfer of power may occur. One ordinarily skilled in the art will appreciate the cancellation of electromagnetic radiation in the far field and absence of such cancellation in the near-field is dictated by one or more solutions of Maxwell's equations for time-varying electric and magnetic fields generated by the currents flowing in opposite directions. One ordinarily skilled in the art should further appreciate the near field active zone is defined by the presence of electromagnetic power in the immediate vicinity of the power transfer system 700. The power transfer system 700 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The via 705 carrying the power feed line to the antenna 704 may pass through the ground plane. In some embodiments, the ground plane may be electrically connected to the antenna. In some embodiments, the ground plane may not be electrically connected to the antenna 704. For such implementations, an insulation area to insulate the via 705 from the ground plane may be constructed between the via 705 and the ground plane. In some embodiments, the ground plane may act as a reflector of the electromagnetic waves generated by the antenna 704. In other words, the ground plane may not allow electromagnetic transmission beyond the bottom surface of the power transfer system 700 by cancelling and/or reflecting the transmission image formed beyond the bottom surface. Reflecting the electromagnetic waves by the ground plane may reinforce the electromagnetic waves transmitted by the antenna 704 from or towards the top surface 701. Therefore, there may be no leakage of electromagnetic power from the bottom surface.

Figure 8:
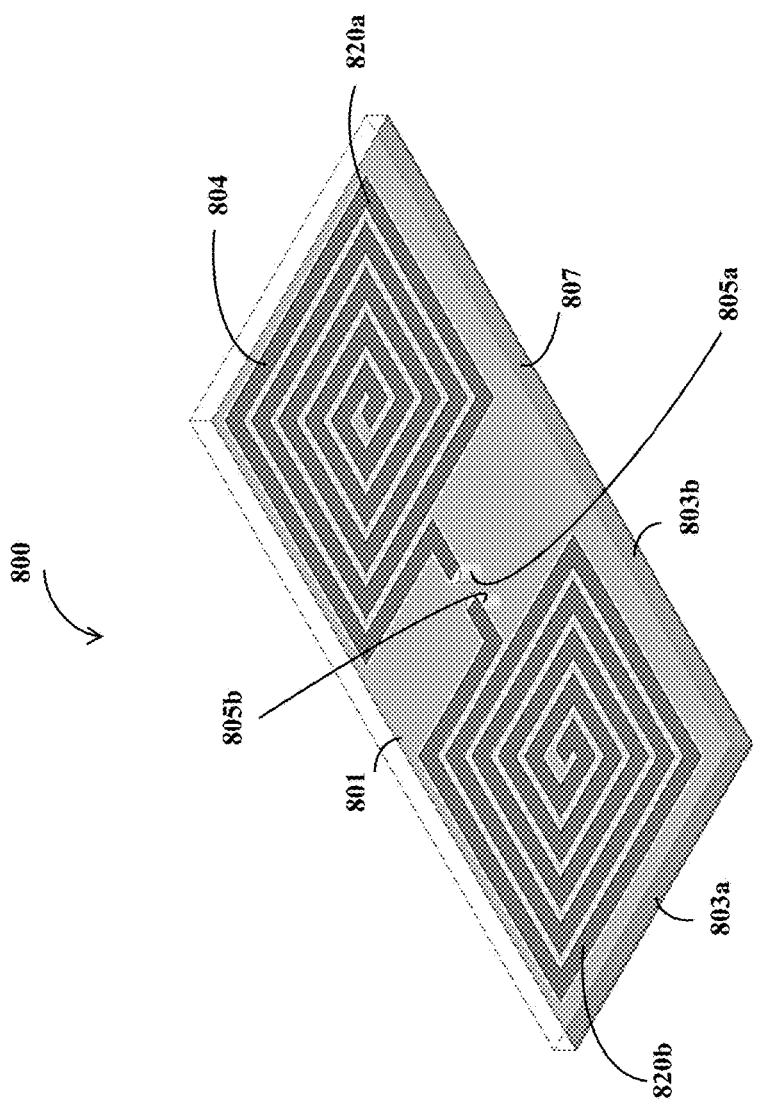
FIG. 8 is a schematic illustration of an exemplary system, according to an embodiment.

FIG. 8 schematically illustrates a top perspective view of an exemplary near-field power transfer system 800, according to an embodiment of the disclosure. In some embodiments, the power transfer system 800 may be a part of or associated with a power transmitter. In other embodiments, the power transfer system 800 may be a part of or associated with a power receiver. The power transfer system 800 may comprise a housing defined by a top surface 801, a bottom surface (not shown), and sidewalls 803. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 801 may allow electromagnetic waves to pass through with minimal obstruction while the sidewalls 803 may obstruct electromagnetic waves by attenuation, absorption, reflection, or other techniques known in the art.

A substrate 807 may be disposed within a space defined between the top surface 801, sidewalls 803, and the bottom surface 802. In some embodiments, the power transfer system 800 may not include a housing and the substrate 807 may include the top surface 801, sidewalls 803, and the bottom surface 802. The substrate 807 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

An antenna 804 may be constructed on or below the top surface 801. When the power transfer system 800 is a part of or associated with a power transmitter, the antenna 804 may be used for transmitting electromagnetic waves. Alternatively, when the power transfer system 800 is a part of or associated with a power receiver, the antenna 804 may be used for receiving electromagnetic waves. In some embodiments, the power transfer system 800 may operate as a transceiver and the antenna 804 may both transmit and receive electromagnetic waves. The antenna 804 may be constructed from materials such as metals, alloys, and composites. For example, the antenna 804 may be made of copper or copper alloys. The antenna 804 may be constructed to have different shapes based on the power transfer requirements. In the exemplary system 800 shown in FIG. 8, the antenna 804 is constructed as a hybrid dipoles comprising a first spiral pole 820*a* and a second spiral pole 820*b*. A first power feed line supplying current to the first spiral pole 820*a* may be provided through a first via 805*a* and a second power feed supplying current the second spiral pole 820*b* may be provided through a second via 805*b*. The antenna segments in each of the spiral poles 820 may mutually cancel the electromagnetic radiation in the far field generated by the spiral dipoles 820 thereby reducing the transfer of power to the far field. For example, the antenna segments in the first spiral pole 820*a* may cancel the far field electromagnetic radiation generated by each other. Additionally, or in the alternative, the far field radiation generated by one or more antenna segments of the first spiral pole 820*a* may be cancelled by the far field radiation generated by one or more antenna segments of the second spiral pole 820*b*. One ordinarily skilled in the art will appreciate the cancellation of electromagnetic radiation in the far field and absence of such cancellation in the near-field is dictated by one or more solutions of Maxwell's equations for time-varying electric and magnetic fields generated by the currents flowing in opposite directions.

The power transfer system 800 may include a ground plane (not shown) at or above the bottom surface. The ground plane may be formed by materials such as metal, alloys, and composites. In an embodiment, the ground plane may be formed by copper or a copper alloy. In some embodiments, the ground plane may be constructed of a solid sheet of material. In other embodiments, the ground plane may be constructed using material strips arranged in shapes such as loops, spirals, and meshes. The vias 805 carrying the power feed lines to the antenna may pass through the ground plane. In some embodiments, the ground plane may be electrically connected to the antenna. In some embodiments, the ground plane may not be electrically connected to the antenna 804. For such implementations, an insulation area to insulate the vias 805 from the ground plane may be constructed between the vias 805 and the ground plane. In some embodiments, the ground plane may act as a reflector of the electromagnetic waves generated by the antenna 804. In other words, the ground plane may not allow electromagnetic transmission beyond the bottom surface of the power transfer system 800 by cancelling and/or reflecting the transmission image formed beyond the bottom surface. Reflecting the electromagnetic waves by the ground plane may reinforce the electromagnetic waves transmitted by the antenna 804 from or towards the top surface 801. Therefore, there may be no leakage of electromagnetic power from the bottom surface.

The hybrid antenna 804 may be required for wideband and/or multiband designs. For example, a non-hybrid structure may be highly efficient at a first frequency and at a first distance between the transmitter and the receiver, but may be at inefficient other frequencies and distances. Incorporating more complex structure such as a hybrid antenna 80 may allow for higher efficiencies along a range of frequencies and distances.

Figure 9A:
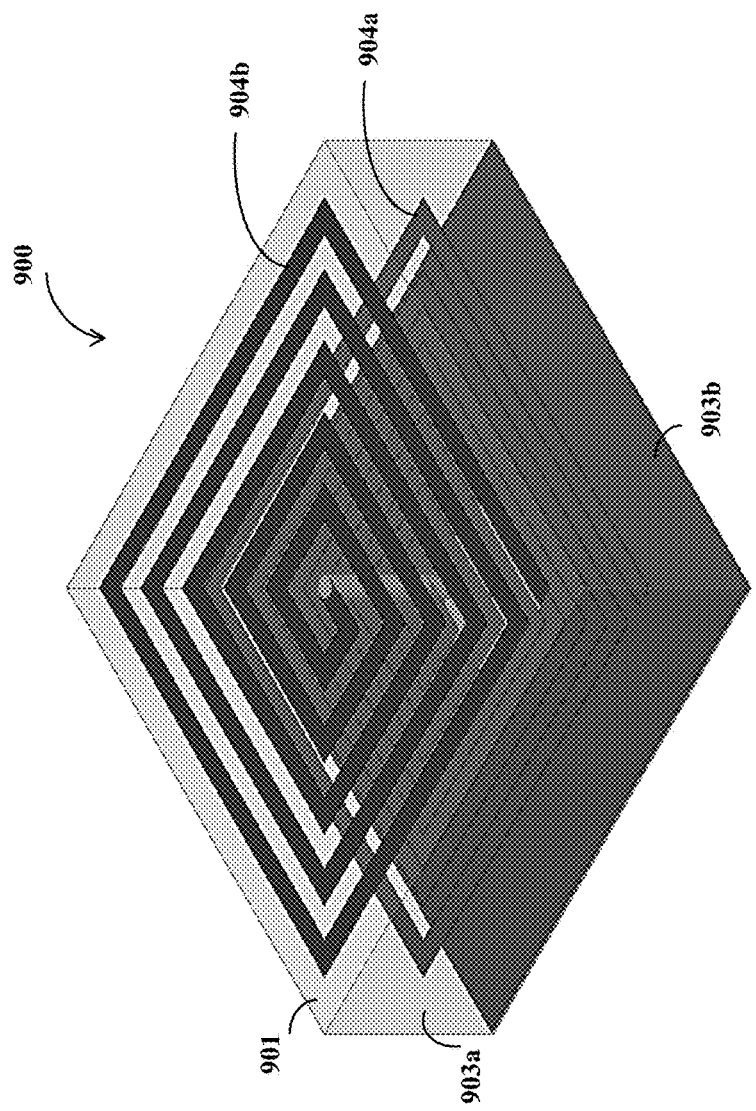

FIG. 9A and FIG. 9B schematically illustrate a top perspective view and a side perspective view respectively of an exemplary near-field power transfer system 900, according to an embodiment of the disclosure. In some embodiments, the power transfer system 900 may be a part of or associated with a power transmitter. In other embodiments, the power transfer system 100 may be a part of or associated with a power receiver. The power transfer system 900 may comprise a housing defined by a top surface 901, a bottom surface 902, and sidewalls 903. In some embodiments, the housing may be constructed of a material creating minimal obstructions for electromagnetic waves to pass through. In other embodiments, different portions of the housing may be constructed with materials having different electromagnetic properties such as permeability and permittivity. For example, the top surface 901 may allow electromagnetic waves to pass through with minimal obstruction while the sidewalls 903 may obstruct electromagnetic waves by attenuation, absorption, reflection, or other techniques known in the art.

A substrate 907 may be disposed within a space defined between the top surface 901, sidewalls 903, and the bottom surface 902. In some embodiments, the power transfer system 900 may not include a housing and the substrate 907 may include the top surface 901, sidewalls 903, and the bottom surface 902. The substrate 907 may comprise any material capable of insulating, reflecting, absorbing, or otherwise housing electrical lines conducting current, such as metamaterials. The metamaterials may be a broad class of synthetic materials that are engineered to yield desirable magnetic permeability and electrical permittivity. At least one of the magnetic permeability and electrical permittivity may be based upon power-transfer requirements, and/or compliance constraints for government regulations. The metamaterials disclosed herein may receive radiation or may transmit radiation, and may act as thin reflectors.

The power transfer system may include hierarchical antennas 904 that may be constructed on or below the top surface 901. When the power transfer system 900 is a part of or associated with a power transmitter, the antennas 904 may be used for transmitting electromagnetic waves. Alternatively, when the power transfer system 900 is a part of or associated with a power receiver, the antennas 904 may be used for receiving electromagnetic waves. In some embodiments, the power transfer system 900 may operate as a transceiver and the antennas 904 may both transmit and receive electromagnetic waves. The antennas 904 may be constructed from materials such as metals, alloys, and composites. For example, the antennas 904 may be made of copper or copper alloys. The antennas 904 may be constructed to have different shapes based on the power transfer requirements. In the exemplary system 900 shown in FIG. 9A and FIG. 9B, the antennas 104 are constructed in a hierarchical spiral structure with a level_zero hierarchical antenna 904a and a level_one hierarchical antenna 904b. Each of the hierarchical antennas 904 may include antenna segments, wherein antenna segments have currents flowing in the opposite directions to cancel out the far field radiations. For example, the antenna segments in the level_zero hierarchical antenna 904a may cancel the far field electromagnetic radiation generated by each other. Additionally, or in the alternative, the far field radiation generated by one or more antenna segments of the level_zero hierarchical antenna 904a may be cancelled by the far field radiation generated by one or more antenna segments of the level_one hierarchical antenna 904b. A power feed line (not shown) to the antennas is carried through a via 905. The power feed line may supply current to the antenna 904.

The power transfer system 900 may include a ground plane 906 at or above the bottom surface 902. The ground plane 906 may be formed by materials such as metal, alloys, and composites. In an embodiment, the ground plane 906 may be formed by copper or a copper alloy. In some embodiments, the ground plane 906 may be constructed of a solid sheet of material. In other embodiments, the ground plane 906 may be constructed using material strips arranged in shapes such as loops, spirals, and meshes. The via 905 carrying a power feed line to the antenna may pass through the ground plane 906. In some embodiments, the ground plane 906 may be electrically connected to one or more of the antennas 904. In some embodiments, the ground plane 906 may not be electrically connected to the antennas 904. For such implementations, an insulation area 908 to insulate the via 905 from the ground plane 906 may be constructed between the via 905 and the ground plane 906. In some embodiments, the ground plane 906 may act as a reflector of the electromagnetic waves generated by the antennas 904. In other words, the ground plane may not allow electromagnetic transmission beyond the bottom surface of the power transfer system 900 by cancelling and/or reflecting the transmission image formed beyond the bottom surface. Reflecting the electromagnetic waves by the ground plane may reinforce the electromagnetic waves transmitted by the antennas 904 from or towards the top surface 901. Therefore, there may be no leakage of electromagnetic power from the bottom surface 902. In some embodiments, there may be multiple ground planes, with a ground plane for each of the hierarchical antennas 904. In some embodiments, the hierarchical antennas have different power feed lines carried through multiple vias.

The hierarchical antennas 904 may be required for wideband and/or multiband designs. For example, a non-hierarchical structure may be highly efficient at a first frequency and at a first distance between the transmitter and the receiver, but may be inefficient at other frequencies and distances. Incorporating more complex structures, such as hierarchical antennas 904, may allow for higher efficiencies along a range of frequencies and distances.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A near-field radio frequency (RF) power transfer system comprising a transmitter, the transmitter comprising:
    a first antenna element disposed on or below a first surface of a substrate and configured to carry a first current in a first direction during a first time period to generate a first RF radiation;
    a second antenna element disposed on or below the first surface of the substrate and configured to carry a second current in a second direction, distinct from and opposite to the first direction, during the first time period to generate a second RF radiation such that (i) a far-field portion of the second RF radiation substantially cancels a far-field portion of the first RF radiation, and (ii) a near-field portion of the second RF radiation does not substantially cancel a near-field portion of the first RF radiation;
    a ground plane disposed on or below a second surface of the substrate, wherein the second surface is opposite to the first surface;
    a first via passing through the ground plane, wherein the first via contains a first power feed line configured to supply the first current; and
    a second via passing through the ground plane, wherein the second via is distinct from the first via and contains a second power feed line configured to supply the second current.

2. The near-field RF power transfer system of claim 1, further comprising:
    a via passing through the ground plane, wherein the via contains a power feed line configured to supply the first and the second currents.

3. The near-field RF power transfer system of claim 1, wherein the first and second antenna elements are segments of a spiral antenna.

4. The near-field RF power transfer system of claim 1, wherein the first antenna element is a segment of a first pole of a dipole antenna, and the second antenna element is a segment of a second pole of the dipole antenna.

5. The near-field RF power transfer system of claim 1, wherein the first and second antenna elements are segments of a loop antenna.

6. The near-field RF power transfer system of claim 1, wherein the first and second antenna elements are segments of a loop antenna comprising concentric loops.

7. The near-field RF power transfer system of claim 1, wherein the first and second antenna elements are segments of a monopole antenna.

8. The near-field RF power transfer system of claim 1, wherein the first and second antenna elements are segments of a hybrid dipole antenna comprising two spiral poles.

9. The near-field RF power transfer system of claim 1, wherein the first and second antenna elements are segments of hierarchical spiral antenna.

10. The near-field RF power transfer system of claim 1, wherein the ground plane is constructed of a solid metal sheet of copper or a copper alloy.

11. The near-field RF power transfer system of claim 1, wherein the ground plane is constructed of metal strips arranged in shapes selected from the group consisting of a loop, a spiral, and a mesh.

12. The near-field RF power transfer system of claim 1, wherein the first and second antenna elements are constructed of copper or a copper alloy.

13. The near-field RF power transfer system of claim 1, wherein the far-field portion of the first RF radiation cancels out the far-field portion of a second RF radiation.

14. The near-field RF power transfer system of claim 1, wherein the ground plane is configured to reflect at least a portion of the RF radiation generated by the first and second antenna elements.

15. The near-field RF power transfer system of claim 1, wherein the ground plane is configured to cancel at least a portion of the RF radiation generated by the first and second antenna elements.

16. The near-field RF power transfer system of claim 1, wherein the power transfer system is configured as a power transmitter.

17. The near-field RF power transfer system of claim 1, wherein the substrate comprises a metamaterial of a predetermined magnetic permeability or electrical permittivity.

18. A method of near-field RF power transfer utilizing a transmitter that comprises first and second antenna elements, a ground plane, and first and second vias, the method comprising:
    supplying, through the first via passing through a ground plane, a first current to the first antenna element such that the first antenna element generates a first RF radiation;
    supplying, through the second via distinct from the first via and passing through the ground plane, a second current to the second antenna element such that the second antenna element generates a second RF radiation,
    wherein the first current is in a first direction and the second current is in a second direction, distinct from and opposite to the first direction such that (i) a far-field portion of the second RF radiation substantially cancels a far field portion of the first RF radiation, and (ii) a near-field portion of the second RF radiation does not substantially cancel a near-field portion of the first RF radiation,
wherein the first and second antenna elements are disposed on or below a first surface of a substrate, and
wherein the ground plane is disposed on or below a second surface of the substrate opposite to the first surface.

* * * * *